Figure 1:
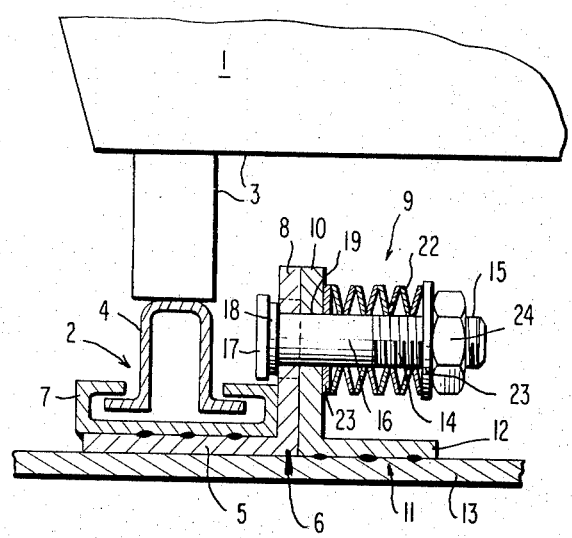

United States Patent [19]
Stegmaier

[11] 3,806,191
[45] Apr. 23, 1974

[54] SEAT IN PARTICULAR CO-DRIVER SEAT IN A MOTOR VEHICLE

[75] Inventor: Wilhelm Stegmaier, Stuttgart, Germany

[73] Assignee: Daimler-Benz Aktiengesellschaft, Stuttgart, Germany

[22] Filed: Aug. 17, 1972

[21] Appl. No.: 281,280

[30] Foreign Application Priority Data
Aug. 17, 1971 Germany.......................... 2141149

[52] U.S. Cl.................. 297/216, 248/429, 188/1 C
[51] Int. Cl. ............................................. B60r 21/10
[58] Field of Search ............ 248/429, 420; 297/216, 297/386; 188/1 R, 1 C

[56] References Cited
UNITED STATES PATENTS
| | | | |
|---|---|---|---|
| 1,921,224 | 8/1933 | Floraday............................ | 248/429 |
| 3,164,222 | 1/1965 | Conrad.............................. | 188/1 C |
| 3,552,795 | 1/1971 | Perkins et al...................... | 297/216 |
| 3,438,674 | 4/1969 | Radke et al........................ | 297/386 |
| 3,446,533 | 5/1969 | Radke et al........................ | 297/386 |
| 3,578,376 | 5/1971 | Hasegawa et al.................. | 297/216 |

FOREIGN PATENTS OR APPLICATIONS
668,106   8/1963   Canada.............................. 248/420

*Primary Examiner*—Marion Parsons, Jr.
*Attorney, Agent, or Firm*—Craig & Antonelli

[57] ABSTRACT

A seat, in particular, a co-driver seat in a motor vehicle with a fastening and support base extending approximately over the entire seat length, in which the fastening of the seat at a fixed vehicle part, such as the floor plate takes place by interposition of force-limiting devices which lose their retentive function when exceeding a predetermined load of the seat in the vehicle longitudinal direction and initiate a predetermined longitudinal sliding movement of the seat up to a fixed limit.

14 Claims, 2 Drawing Figures

PATENTED APR 23 1974　　　　　　　　　　　　　　　　3,806,191

SEAT IN PARTICULAR CO-DRIVER SEAT IN A MOTOR VEHICLE

The present invention relates to a seat, especially to the co-driver or passenger seat in a motor vehicle having a fastening and support base extending over the entire seat length.

Front seats in present-day motor vehicles possess as a rule the possibility to change individually the seat position, after disengagement of a locking device by displacement of the seat in the vehicle longitudinal direction. While one is able to obtain thereby a particularly easy accessibility of the front seats, one increases at the same time the distance between the passengers and the instrument panel.

Tests of front end impact accidents particularly with non-buckled persons, i.e., persons whose seat belts had not been fastened, have indicated that at first a displacement of such persons takes place up to the impingement of the knees and chest thereof at the instrument panel. In the further course of movement, a downward lever movement of the pelvis takes place owing to the upper thighs engaging the instrument panel from below. By reason of the high load on the relatively soft front seat portion of the seat, a sliding off of the passengers into the leg space is made possible. For the most part, serious flexion- and fracture-appearances occur thereby at the neck vertebrae and at the skull base with considerable injuries in part.

It is the aim of the present invention to create the possibility also subsequently, while maintaining the customary seat-adjusting mechanisms, to reduce in case of danger the distance between the front passengers and the instrument panel or steering wheel to such an extent that at least a sliding-under of the body is prevented and a more favorable impact position as regards the load capacity of the passenger is achieved.

A seat is therefore proposed, especially a co-driver or front passenger seat in a motor vehicle, having a mounting and support base extending approximately over the entire seat length, whereby according to the present invention the fastening of the seat at a fixed vehicle part, for example, at the floor sheet metal plate, takes place under interposition of force-limiting means which lose their retention function when exceeding a predetermined load of the seat in the vehicle longitudinal direction, and which initiate a predetermined longitudinal displacement of the seat.

In one preferred embodiment of the present invention, bolts which are subject to adjustable prestress are provided as force-limiting means which press against one another two approximately vertically extending legs of profile rails coordinated to oppositely disposed seat guide rails.

According to a further feature of this embodiment one leg of the horizontally extending legs of the profile rails receives the seat guide rail not secured at the seat whereas the other leg is connected with a fixed vehicle part, for example, with the vehicle floor.

A directed displaceability and a safe limiting of this movement is achieved if the bolt includes a collar between its cylindrical shank provided in part with a thread and its head, and if the leg portion receiving the seat guide rail is provided with at least one slot of the width of the diameter of the shank, which slot runs out at its ends into a respective elongated aperture with a width corresponding to the diameter of the collar.

A displaceability of the seat both in case of a front collision as also in case of a rear collision is achieved if the installed position of each bolt received in a bore corresponding to the diameter of the shank and provided in the leg portion fixed with the vehicle, is disposed approximately in the center between the two outer elongated apertures. The prestress of the bolt is appropriately produced by compressible cup or plate springs.

Accordingly, it is an object of the present invention to provide a seat, especially a co-driver or passenger seat in a motor vehicle which avoids by simple means the aforementioned shortcomings and drawbacks encountered in the prior art.

Another object of the present invention resides in a seat, especially a co-driver seat in a motor vehicle which automatically assures a position of the seat in case of front or rear end collision that reduces the danger of serious injuries as a result of a sliding under of the body.

A further object of the present invention resides in a seat, especially in a co-driver seat in a motor vehicle which is simple in construction, yet assures an intentional displaceability and a safe limit of the displacing movement by simple structural devices.

Figure 2:
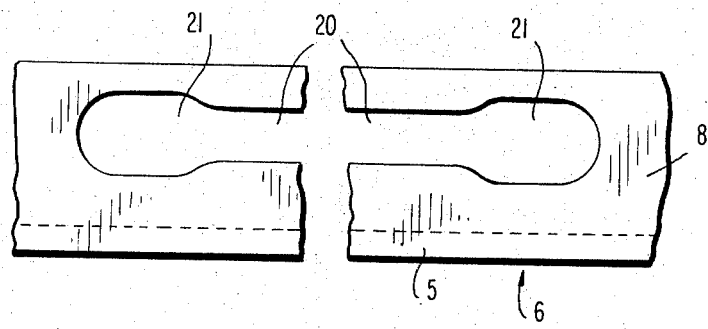

These and further objects, features and advantages of the present invention will become more apparent from the following description when taken in connection with the accompanying drawing which shows, for purposes of illustration only, one embodiment in accordance with the present invention, and wherein:

FIG. 1 is a cross-sectional view through the arrangement of a force-limiting means in accordance with the present invention within the area of a seat guide rail of a seat bottom part illustrated schematically; and FIG. 2 is a side elevational view of the elongated aperture in one of the profile rails not secured at the vehicle.

Referring now to the drawing wherein like reference numerals are used throughout the two views to designate like parts, and more particularly to FIG. 1, a seat 1 carries along its outer sides—of which only the outer side disposed near the doors (not shown) is reproduced—a seat-adjusting mechanism generally designated by reference numeral 2 and illustrated only in principle, which essentially consists of a seat guide rail 4 connected with the bottom side 3 of the seat 1; the seat guide rail 4 is guided in a further seat guide rail 7 connected with a horizontal leg 5 of a profile rail generally designated by reference numeral 6. The approximately vertically projecting other leg 8 of the profile rail 6 is connected by means of a force-limiting means generally designated by reference numeral 9 which is under an adjustable prestress, with a generally vertically extending leg 10 of a further profile rail generally designated by reference numeral 11 whose other horizontally extending leg 12 is secured at the vehicle floor 13. Each force-limiting means 9 is constructed as bolt 14 that includes a collar 18 between a cylindrical shank 16 provided in part with a thread 15 and a head portion 17. Whereas the leg portion 10 has a number of bores 19 corresponding to the number of force-limiting means 9 for the respective accommodation of the shank 16, the leg portion 8 is constructed within the area of each bolt 14 as illustrated in FIG. 2. A slot 20 whose width corresponds to the diameter of the shank 16 runs out on both ends into an elongated aperture 21 with a width that is equal to the diameter of the collar 18.

The installed position of each bolt 14 is so selected that its shank 16 received by the slot 20 is disposed approximately in the center between the two elongated apertures 21. Several stacked cup or plate springs 22 which are supported by way of washers 23 at the leg portion 10 and at a nut 24, can exert an adjustable force against the two leg portions 8 and 10 by a tightening movement of the nut 24.

If in case of collision the predetermined load of the seat 1 is exceeded, then the seat is displaced, depending on the impact direction, guided in the slots 20, either forwardly or rearwardly. If the shank 16 leaves the slot 20, then conditioned by the prestress of the plate springs 22, the collar 18 is pulled into the coordinated elongated aperture 21 and assures an anchoring of the seat 1 in this end position. The forward seat position which is established during this operation is so selected and dimensioned that a sliding off of the passenger is avoided.

Also in case of a rear end collision or impact, the device proposed in accordance with the present invention is very useful as the occurring deceleration can be considerably reduced thereby. It is also possible by simple means to attain during the sliding back of the seat by energy absorption a further reduction of the deceleration value acting on the body. This could be realized, for example, in that the width of the slot 20 is smaller in the corresponding area than the diameter of the shank 16.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A seat arrangement for a vehicle having a relatively fixed vehicle part, comprising: a vehicle seat adjustably secured in mutually oppositely disposed seat guide rails, profile rail means connected to said seat guide rails for permitting a predetermined longitudinal sliding movement, and force-limiting means for fastening said vehicle seat to the fixed vehicle part, said force-limiting means being operable to lose their retention function upon exceeding a predetermined load of the seat in the vehicle longitudinal direction and thereby initiating said predetermined longitudinal sliding movement of the seat said force-limiting means including bolt means operatively connected with said profile rail means and means for adjustably prestressing said bolt means.

2. A seat arrangement according to claim 1, wherein said fixed vehicle part includes a floor plate of the vehicle and said seat is fastened thereto.

3. A seat arrangement according to claim 2, wherein said seat is a passenger seat in a motor vehicle, said passenger seat being provided with a mounting and support base extending approximately over the entire seat length.

4. A seat arrangement according to claim 3, wherein said profile rail means includes two approximately upwardly extending leg portions said bolt means pressing said leg portions against one another.

5. A seat arrangement according to claim 4, wherein said profile rail means includes two approximately horizontal leg portions, one of said two horizontally extending leg portions receiving the seat guide rail not secured at the seat whereas the other leg portion of said two horizontally extending leg portions is connected with said floor plate.

6. A seat arrangement for a motor vehicle having a floor plate, comprising: a passenger seat having a mounting and support base extending approximately over the entire seat length, said passenger seat being fastened at the floor plate of the vehicle, mutually oppositely disposed seat guide rail means for permitting said passenger seat to be adjustable, said seat guide rail means including a first guide rail portion secured to said passenger seat and a second guide rail portion not secured to said passenger seat, force limiting means for fastening said passenger seat to said floor plate, said force limiting means being operable to lose their retention function upon exceeding a predetermined load of said passenger seat in the vehicle longitudinal direction and initiating a predetermined longitudinal sliding movement of said seat, said force limiting means including bolt means under adjustable prestress and profile rail means coordinated to said mutually oppositely disposed seat guide rails, said profile rail means including two approximately upwardly extending leg portions and two approximately horizontally extending leg portions, said bolt means pressing said upwardly extending leg portions against one another, one leg portion of the two horizontally extending portion receiving said second guide rail portion, the other leg portion of the two horizontally extending leg portions being connected with said floor plate of the vehicle, said bolt means including a cylindrical shank portion provided in part with a thread and a head portion, a collar on said bolt means between said thread part and said head portion, said horizontally extending leg portion receiving the second guide rail portion being provided with at least one slot corresponding to the width of the diameter of the shank, which extends at its ends into a respective elongated aperture with a width corresponding to the diameter of the collar.

7. A seat arrangement according to claim 6, wherein a bore corresponding to the diameter of the shank is provided in said leg portion connected with said floor plate of the vehicle, each bolt means in the installed portion is received by said bore and is disposed approximately in the center between the two outer elongated apertures.

8. A seat arrangement according to claim 7, wherein the prestress of the bolt means is produced by compressible plate spring means.

9. A seat arrangement according to claim 1, wherein said profile rail means includes two approximately upwardly extending leg portions said bolt means pressing said leg portions against one another.

10. A seat arrangement according to claim 9, wherein said profile rail means includes two approximately horizontal leg portions, one of said two horizontally extending leg portions receiving the seat guide rail not secured at the seat whereas the other leg portion of said two horizontally extending leg portions is connected with said floor plate.

11. A seat arrangement for a vehicle having a relatively fixed vehicle part, comprising: force limiting means for fastening the seat to said fixed vehicle part, said force limiting means being operable to lose their retention function upon exceeding a predetermined load of the seat in the vehicle longitudinal direction and initiating a predetermined longitudinal sliding movement of the seat, said force limiting means includes bolt means under adjustable prestress and profile rail means including two approximately upwardly extending leg portions coordinated to mutually oppositely disposed seat guide rails, said bolt means including a cylindrical shank portion provided in part with a thread and a head portion, a collar on said bolt means between said thread part and said head portion, said leg portion receiving said second seat guide rail portion being provided with at least one slot corresponding to the width of the diameter of the shank, which extends at its ends into a respective elongated aperture with a width corresponding to the diameter of the collar.

12. A seat arrangement according to claim 11, wherein a bore corresponding to the diameter of the shank is provided in said leg portion connected with said floor plate of the vehicle, each bolt means in the installed portion is received by said bore and is disposed approximately in the center between the two outer elongated apertures.

13. A seat arrangement according to claim 12, wherein said means for prestressing said bolt means includes a compressible plate spring means.

14. A seat arrangement according to claim 10, wherein said means for prestressing said bolt means includes a compressible plate spring means.

* * * * *